United States Patent

[11] 3,631,340

[72] Inventor Joseph G. Miller
22121 River Oaks Drive, Cleveland, Ohio 44116
[21] Appl. No. 30,392
[22] Filed Apr. 21, 1970
[45] Patented Dec. 28, 1971

[54] PHASE ANGLE ANALYZER
10 Claims, 9 Drawing Figs.
[52] U.S. Cl. .................................................... 324/83 A, 328/109
[51] Int. Cl. ............................................... G01r 25/00, H03d 13/00
[50] Field of Search ........................................ 324/83 A, 83 D; 328/109

[56] References Cited
UNITED STATES PATENTS
2,963,648 12/1960 Baskin et al. ................. 324/83 A
3,519,841 7/1970 Leinfelder ..................... 324/83 A X
OTHER REFERENCES
Yu; Electronics; Jan. 1956; pp. 138–140.

*Primary Examiner*—Alfred E. Smith
*Attorney*—Griffin Branigan and Kindness

ABSTRACT: A phase angle analyzer for producing a first output signal having a magnitude proportional to the difference in phase between first and second input signals, and having a polarity depending upon whether the first or second input signal is leading. The input signals are applied to a first channel, and integrated and applied to a second channel. In each channel, the resulting signals are converted to square waves and fed to the inputs of a first differential amplifier. The square waves are also differentiated to produce pulses for controlling a bistable multivibrator. The multivibrator and differential amplifier control a plurality of gates acting as a double-pole, double-throw switch. The gated outputs from the two channels are logically combined and applied to a further differential amplifier. This amplifier produces at its output a series of pulses, each pulse being proportional in duration to the magnitude of the phase difference between the two input signals. The pulses are positive if the first signal leads the second signal, and are negative if the first signal lags the second signal. The pulses from the further differential amplifier are passed through a filter and applied to a meter to provide a direct reading of the phase relationship between the input signals. The output of the filter is differentiated and applied to a second meter to provide an indication of the rate at which the phase difference between the input signals is changing.

INVENTOR
JOSEPH G. MILLER

BY *Griffin, Branigan and Kindness*

ATTORNEYS

INVENTOR
JOSEPH G. MILLER

BY Griffin, Branigan and Kindness
ATTORNEYS

INVENTOR
JOSEPH G. MILLER

BY *Griffin, Branigan and Kindness*
ATTORNEYS

INVENTOR
JOSEPH G. MILLER

PHASE ANGLE ANALYZER

BACKGROUND OF THE INVENTION

There is reserved to the United States Government a nonexclusive, irrevocable, royalty-free license in this invention, with power to grant licenses for all governmental purposes.

This invention relates to apparatus for analyzing the phase difference between two similar signals. More specifically, it relates to apparatus for determining the magnitude, direction, and rate of change of the phase difference between two signals.

It is often desirable to maintain two signals in phase with each other. One method of doing this is to continuously monitor the phase difference between the two signals, and feed a signal proportional to this difference back to a control apparatus which shifts one of the signals until there is a zero phase difference. Ideally, to maintain two signals in phase with one another, three values should be monitored: (1) the magnitude of any transitory phase difference, (2) the direction of the phase difference, and (3) the rate of change of the phase difference. While prior art phase-analyzing devices provide information as to the magnitude of the phase difference between two signals, most of them do not measure the direction and the rate of change of the phase difference automatically. These two preceding values are important because they enable the control apparatus to determine the direction and rate at which it must shift one of the signals in order to bring the two signals back into phase within the shortest possible time.

Also, it is desirable that the output signal of the phase analyzer be directly proportional in magnitude to the phase difference between the input signals. More particularly, a phase analyzer should provide an output signal which has zero magnitude at 0° phase difference and a maximum magnitude at 180° phase difference. However, many prior art phase analyzers provide a zero reading at 0° phase difference and another zero reading at 180° phase difference. These analyzers provide an output voltage signal that has zero magnitude at zero degrees phase difference, with the output voltage increasing in magnitude as the phase difference increases toward 90°. The output voltage signal decreases in magnitude as the phase difference increases from 90° toward 180° so that the output voltage signal again has a zero magnitude at 180° phase difference. Problems are created in the use of such a signal for automatically correcting the phase difference because there are two identical ranges of voltage magnitude within one-half half cycle between which the control apparatus must distinguish.

It is also preferable that the output signal of a phase difference analyzer change polarity when the input signals go to phase lead or phase lag greater than 180°. That is, if the output on the meter scale shows a lead of 179° and this lead is increased by 2°, the output should show on the meter scale a lag of 179° rather than a lead of 181°. The reason for this is that once the phase difference exceeds 180°, it is easier for the phase-correcting device to bring the signals back into phase by shifting a signal in the opposite direction from the direction it would have shifted the signal before the phase difference exceeded 180°. Most prior art phase difference analyzers do not provide an output signal which automatically changes polarity at 180°.

SUMMARY OF THE INVENTION

It is an object of this invention to provide a phase difference analyzer which measures the magnitude, the direction, and the rate of change, of the phase difference between two similar alternating signals automatically while producing an output signal having a magnitude which is proportional to the magnitude of the phase difference between 0° and 180° phase difference, said output signal changing polarity when the phase difference exceeds 180°. The analyzer may be used as a laboratory measuring instrument or as part of a regulatory system for maintaining the proper phase relationship between two signals.

In accordance with the principles of this invention, two signals to be analyzed are converted into square wave and their difference measured, using a differential amplifier. This provides an output signal which is directly proportional in magnitude to the phase difference between the two signals for any phase difference between 0° and 180°.

The polarity of the output signal indicates the direction of the phase difference. More specifically, the positive increments of the phase difference are channeled to one path and the negative increments of the phase difference are channeled to another path when the first signal leads the second signal. On the other hand, the second signal leads the first signal, the negative and positive increments are switched to the opposite paths. Thus, the output signal has a polarity which is related to the direction of the phase difference.

In order to measure the rate of change of phase difference, the output signal representing phase difference is differentiated. This provides a second output signal which is proportional to the rate of change of the phase difference.

BRIEF DESCRIPTION OF THE DRAWINGS

The foregoing and other object, features and advantages of the invention will be apparent from the following description of a preferred embodiment of the invention, as illustrated in the accompanying drawings in which reference characters refer to the same part throughout the different views. The drawings are not necessarily to scale, emphasis instead being based upon illustrating the principles of the invention in a clear manner.

DESCRIPTION OF A PREFERRED EMBODIMENT

Figure 1:
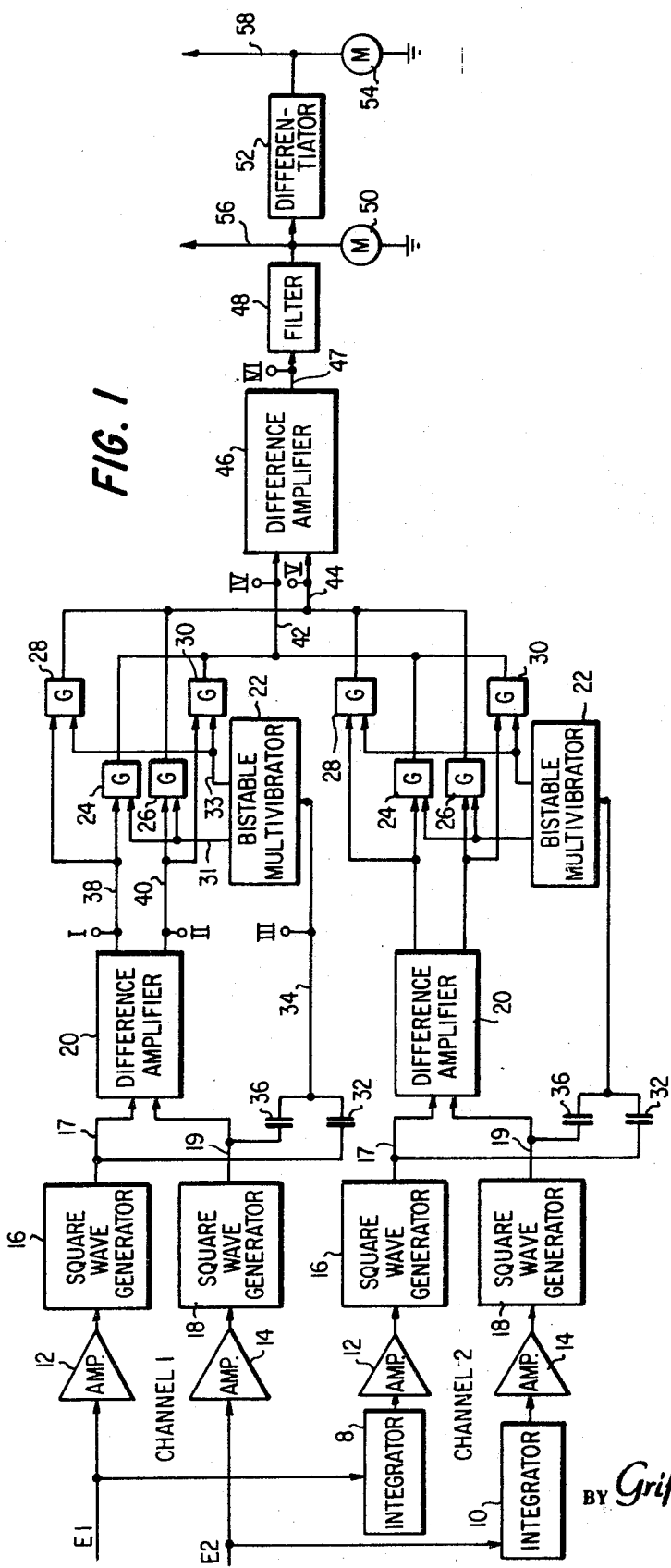
FIG. 1 is a block diagram of a phase analyzer in accordance with the present invention.

Referring now to the drawing and more particularly to FIG. 1, a preferred embodiment of the phase analyzer includes two similar channels 1 and 2 connected in parallel.

Channel 1 comprises first and second amplifiers 12 and 14, first and second square wave generators 16 and 18, a difference amplifier 20, a bistable multivibrator 22, and four gates 24, 26, 28, and 30. Two sine wave signals E1 and E2, to be analyzed, are applied to the inputs of amplifier 12 and 14, respectively. The outputs of amplifiers 12 and 14 are connected to the inputs of square wave generators 16 and 18, respectively. The square wave generators convert the sine wave signals to square waves, the relative phase of the two square wave generator outputs being exactly the same as the relative phase between E1 and E2.

The output of square wave generator 16 is applied to one input of differential amplifier 20, and is also applied through a capacitor 32 to the input lead 34 of bistable multivibrator 22. The output of square wave generator 18 is applied to a second input of differential amplifier 20, and is also a applied through a capacitor 36 to the input lead 34 of the bistable multivibrator 22.

The differential amplifier 20 places the square waves on a common reference point so that the difference between the square waves may be measured. The differential amplifier has two output leads 38 and 40. Output 38 is connected to one input of gates 24 and 28 and output 40 is connected to one input of gates 26 and 30. The gates 24, 26, 28 and 30 each have a second input connected to an output of the bistable multivibrator 22. The connections are such that when the multivibrator is in one stable state, its output 31 conditions gates 24 and 26 so as to pass the output signals on leads 38 and 40 to the leads 42 and 44, respectively. On the other hand, the second output 33 of the multivibrator is connected to gates 28 and 30 so that when the multivibrator is in its second stable state, gate 28 passes the signal on lead 38 to lead 44 and gate 30 passes the signals on lead 40 to lead 42. Thus, the gates 24, 26, 28, and 30 act as a double-pole, double-throw switch for connecting leads 38 and 40 to leads 42 and 44, respectively, when the multivibrator is in one state, and for the reversing lead connections when the multivibrator changes state.

The multivibrator 22 responds only to input pulses of alternate polarity. That is, if a negative going pulse switches the multivibrator to one state it remains in that state until it receives a positive going pulse. The positive going pulse switches the multivibrator to its second stable state and it remains in the second state until it receives a negative going input pulse. The input pulses are derived from square wave generators 16 and 18 through differentiating capacitors 32 and 36.

Channel 2 is substantially identical to channel 1 described above, so like reference numerals have been assigned to corresponding elements. There is one distinction between the two channels. In channel 2, incoming signals E1 and E2 are integrated by integrators 8 and 10, respectively, with the outputs of integrators 8 and 10 being connected to the inputs of amplifiers 12 and 14, respectively. Integrators 8 and 10 have the effect of delaying E1 and E2 approximately 86°.

Figure 8:
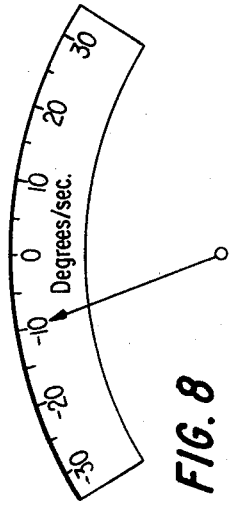
Figure 7:
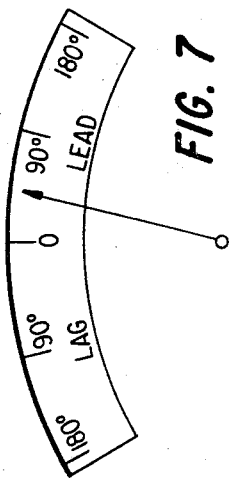
FIG. 7 shows a meter scale used in the invention to read the magnitude and direction of phase difference; and, FIG. 8 shows a meter scale used in the invention to read the rate of change of phase difference.

The outputs of gates 26 and 28 in both channels are tied together and connected to input 44 of a differential amplifier 46. The outputs of gates 24 and 30 are tied together and connected to the second input 42 of the amplifier. As subsequently explained in greater detail, differential amplifier 46 measures the difference between the signals appearing on leads 42 and 44, and produces an output proportional in magnitude to the phase difference and having a polarity depending upon the direction of the phase difference between E1 and E2. The output from differential amplifier 46 is fed through a filter 48 to remove high-frequency components. The output of filter 48 is applied to a meter 50 and through a differentiator 52 to a meter 54. The magnitude of current flow through meter 50 provides an indication of the magnitude of the phase difference between E1 and E2, and the direction of current flow indicates whether E1 leads or lags E2. A suitable scale for meter 50 is represented in FIG. 7. The meter 54 provides a reading indicating the rate at which the phase difference between E1 and E2 is changing, and a suitable scale for this meter is shown in FIG. 8.

The present invention is admirably suited for use as part of a phase control system. For purposes of regulatory control, leads 56 and 58 may be provided. A signal will be developed on lead 56 which represents the magnitude and direction of the phase difference between E1 and E2. A signal will be developed on lead 58 which represents the rate at which the phase difference between E1 and E2 is changing.

Figure 2A:
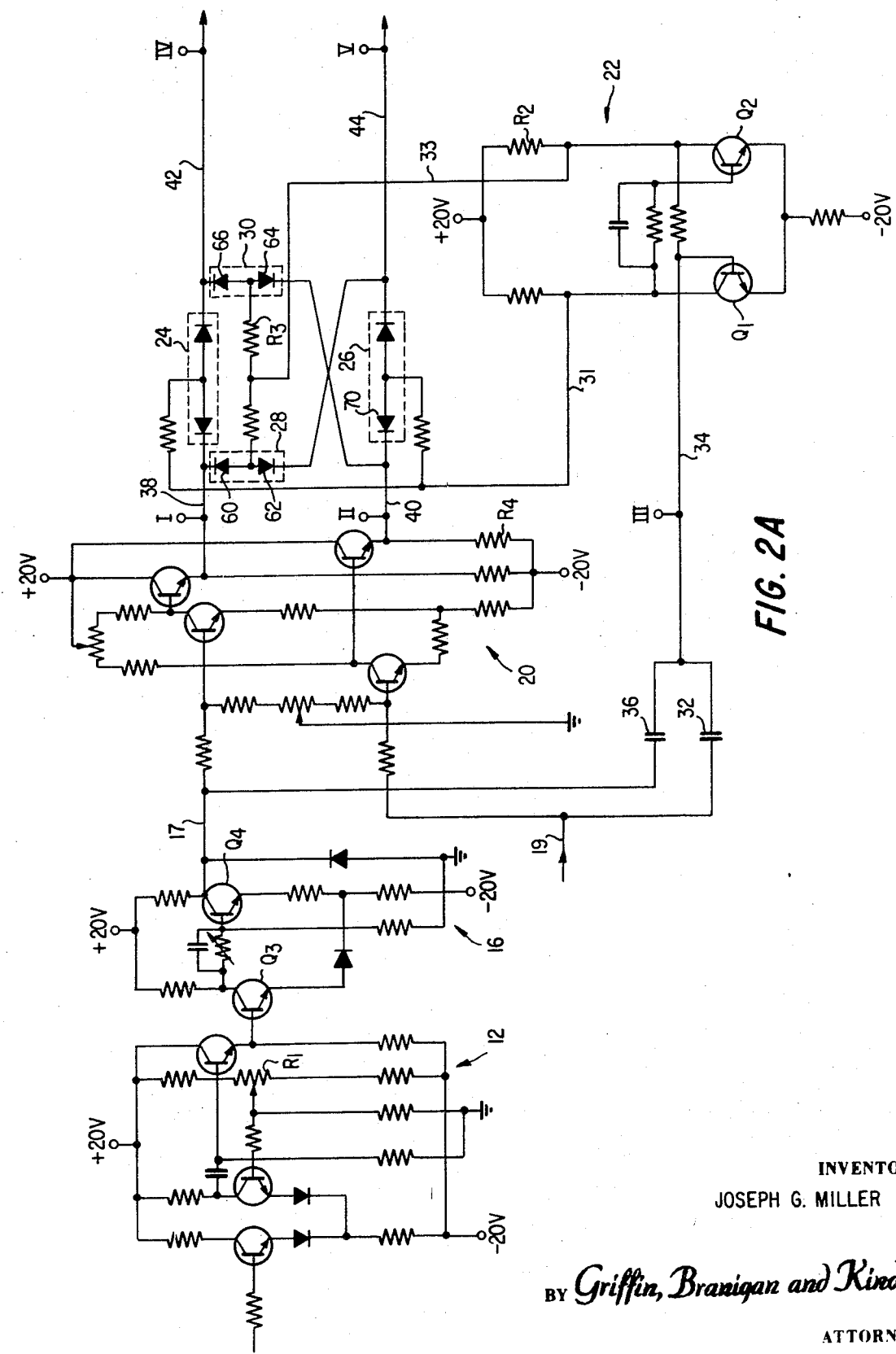
FIGS. 2A and 2B are schematic circuit diagrams showing the details of circuit elements illustrated in block form in FIG. 1.

FIG. 2A shows the details of a typical amplifier 12, square wave generator 16, difference amplifier 20, bistable multivibrator 22, and gates 24, 26, 28, and 30. Amplifiers 14 are identical to amplifier 12, and square wave generators 18 are identical with square wave generator 16.

Amplifier 12 is of conventional design and is provided with a potentiometer R1 for adjusting its degree of amplification. The adjustment of R1 is made depending upon the magnitude of the input signal to the analyzer. In a practical embodiment, the analyzer may determine the phase difference between two signals having amplitudes varying from 0.1 to 60 volts RMS and frequencies from 10 cycles to 1 megacycle.

The output of amplifier 12 is fed to square wave generator 16 which comprises a conventional Schmitt trigger. The Schmitt trigger includes a normally conducting output transistor Q4 and a normally nonconducting input transistor Q3. Transistor Q3 remains off as long as the output from amplifier 12 remains below a first critical level. As the output of the amplifier increases to the first critical level, the transistor Q3 is turned on and, through regenerative action, Q4 is turned off. This condition is maintained until the output voltage of amplifier 12 drops below a second critical voltage at which time Q3 is again turned off and Q4 is turned on. When Q4 is off, the output voltage from the square wave generator is at a high level of about 20 volts, and when the transistor Q4 is turned on, this output voltage drops to about ground level.

The output of the Schmitt trigger is applied by way of lead 17 to one input of the differential amplifier 20. The output of square wave generator 18 (not shown in FIG. 2A) is applied to the second input of the differential amplifier by way of lead 19. The differential amplifier is of conventional design and produces at its first and second output terminals 38 and 40 two signals whose difference in magnitude at any instant is equal to the difference in magnitude between the input signals applied to the amplifier over leads 17 and 19. However, as will become evident from the subsequent description, the difference between the two outputs from the differential amplifier is not utilized. Instead, the two outputs are utilized individually to selectively condition the gates 24, 26, 28, and 30 so that the gates may pass signals from multivibrator 22 to the leads 42 and 44.

Figure 3:
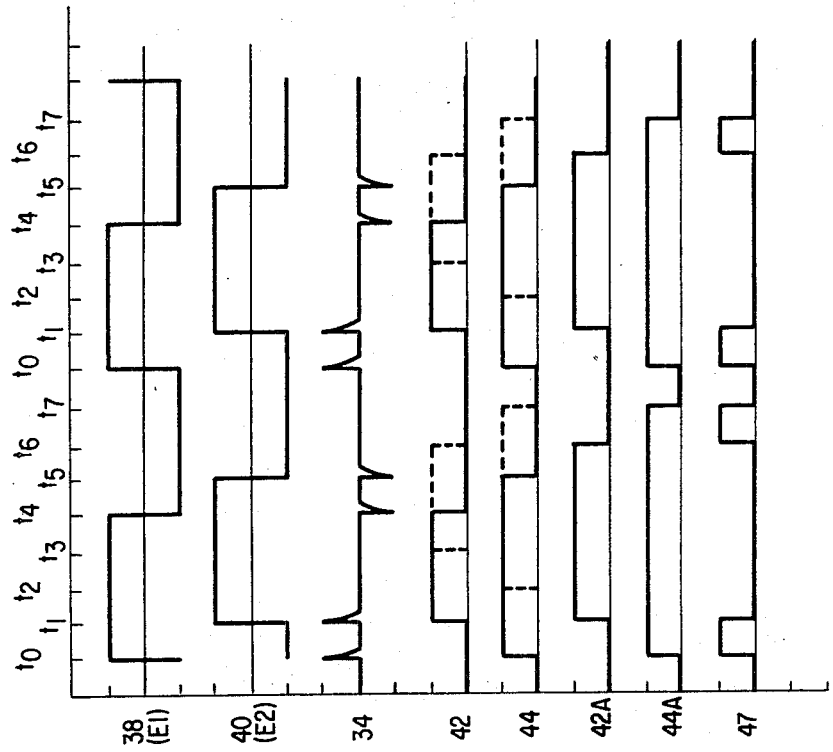
FIG. 3 represents signal waveforms as they appear at various points in the circuit when a first input signal leads a second input signal.

The signals appearing on leads 38 and 40 are trains of square wave pulses as illustrated by the waveforms 38 and 40 in FIG. 3. The phase difference between the pulses on leads 38 and 40 is exactly the same magnitude as the phase difference between the sine wave signals E1 and E2 applied to the inputs of amplifiers 12 and 14.

The gates 24, 26, 28 and 30 each comprise a pair of diodes having their anodes connected in common. Output lead 38 of the differential amplifier is connected to the cathode of one of the diodes in each of the gates 24 and 28. The output lead 40 of the differential amplifier is connected to the cathode of one of the diodes in each of the gates 26 and 30. One diode in each of the gates 26 and 28 has its cathode connected to the lead 44 whereas one of the diodes in each of the gates 24 and 30 has its cathode to the lead 42.

The gates 24, 26, 28, and 30 are further controlled by the bistable multivibrator 22. When the multivibrator is in one stable state, a signal on lead 31 is applied to the anodes of the diodes in gates 24 and 26. When the multivibrator is in its other stable state, a signal is applied over lead 33 to the anodes of the diodes in gates 28 and 30.

The operation of the invention may best be understood by consideration of FIGS. 1 and 2A in conjunction with the specific example illustrated by FIG. 3. FIG. 3 illustrates a specific condition where the two signals to be compared, E1 and E2, are out of phase and the signal E1 leads the signal E2 by 45°. In channel 1, the signals E1 and E2 are amplified by amplifiers 12 and 14 and applied to square wave generators 16 and 18. The outputs of the square wave generators are applied to the differential amplifier 20 so that each differential amplifier produces at its outputs 38 and 40 the trains of square wave pulses as illustrated in FIG. 3. The outputs from square wave generators 16 and 18 are also differentiated by capacitors 32 and 36 and applied over lead 34 to the bistable multivibrator.

At $t_0$ when E1 goes positive, the positive going output of square wave generator 16 is differentiated by capacitor 36 and applied to the multivibrator as a positive pulse. This pulse is illustrated in waveform 34. It will be understood that the waveform 34 merely represents the differentiated square wave pulses and does not show the actual voltage existing on lead 34. The pulse turns on transistor Q1 in the multivibrator 22 (FIG. 2A). When transistor Q1 is turned on, its collector voltage drops thus turning off Q6. The collector voltage of Q2 rises, thus holding Q1 on.

The high level (positive) voltage at the collector of Q2 is applied over lead 33 to the anode of the diodes in gates 28 and 30. In gate 28, the diode 60 is back-biased by the more positive (+20 v.) signal on lead 38 so the high-level signal from the collector of Q2 passes through diode 62 to the lead 44. On the other hand, in gate 30 the diode 64 has a low-level (−20 v.) signal applied to its cathode so current flow is established from +20 v. through R2 in the multivibrator, R3 associated with gate 30, diode 64, and R4 in the differential amplifier 20, to −20 v. The values of resistances R2, R3, and R4 are such that the voltage at the anodes of the diodes in gate 30 drops below ground level. Thus, the diode 66 is back-biased so that no signal passes through diode 66 to lead 42.

The low-level (negative) voltage at the collector of Q1 is applied over lead 31 to the anodes of the diodes in gates 24 and 26. This places the anodes of the diodes at a negative value with respect to ground level so that no signals pass through these gates to the leads 42 and 44.

At $t_1$, when $E_2$ goes positive, the positive going output of square wave generator 18 is differentiated by capacitor 32 and applied to multivibrator 22 as a positive pulse. The pulse tends to turn transistor Q1 on but, since it is already on, the pulse has no effect. However, the lead 40 goes positive at $t_1$ thus back-biasing diode 64 of gate 30. The high-level signal from the collector of Q2 passes through diode 66 to lead 42. Thus, waveform 42 goes positive at $t_1$.

At $t_4$, when E1 goes negative, the negative going output of square wave generator 16 is differentiated by capacitor 36 and applied to the multivibrator 22 as a negative going pulse. This pulse turns off the transistor Q1 and switches the multivibrator. When transistor Q1 is turned off, its collector voltage rises thus turning transistor Q2 on. The collector voltage of Q2 drops, thus holding Q1 off.

The negative voltage at the collector of Q2 is applied over lead 33 to the anodes of the diodes in gates 28 and 30 thus blocking these gates. The high-level voltage at the collector of Q1 over lead 31 to the anodes of the diodes in gates 24 and 26. The signal on lead 40 is still positive at $t_4$ so the high-level voltage from the collector of Q1 passes through gate 26 to the lead 44. However, the signal on lead 38 goes negative at $t_4$ thus blocking any output through gate 24 to lead 42. Therefore, at time $t_4$ waveform 42 drops to the ground level while the waveform 44 remains at the positive or high level.

At time $t_5$, when E2 goes negative, the negative going output of square wave generator 18 is differentiated by capacitor 32 and applied to the multivibrator 22 as a negative going pulse. The pulse tends to turn transistor Q1 off, but since the transistor is already off the pulse has no effect. The signal on lead 40 also goes negative at time $t_5$ thereby blocking gate 26 and terminating its high-level output to lead 44. Therefore, by or at time $t_5$ both waveforms 42 and 44 have returned to ground level.

Nothing further happens until the next $t_0$ when E1 again goes positive. The cycle described above is then repeated for channel 1.

The above description of the waveforms of FIG. 3 has ignored the operation of channel 2. The same operations take place in channel 2 as for channel 1, but all signals are delayed approximately 86° because E1 and E2 are integrated before being amplified and applied to the square wave generators. Thus, channel 2 also produces pulses on the lead 42 and 44. Channel 2 also produces a positive signal on lead 42 at $t_3$ which is approximately 86° after $t_1$, the signal being sustained until $t_6$ which is approximately 86° after $t_4$. This signal is shown in broken outline in waveform 42.

Channel 2 also produces a positive signal on lead 44 during each cycle if E1 leads E2. The signal begins at $t_2$ which is approximately 86° after $t_0$ and ends at $t_7$ which is approximately 86° after $t_5$. These signals are shown in broken outline in waveform 44.

Figure 2B:
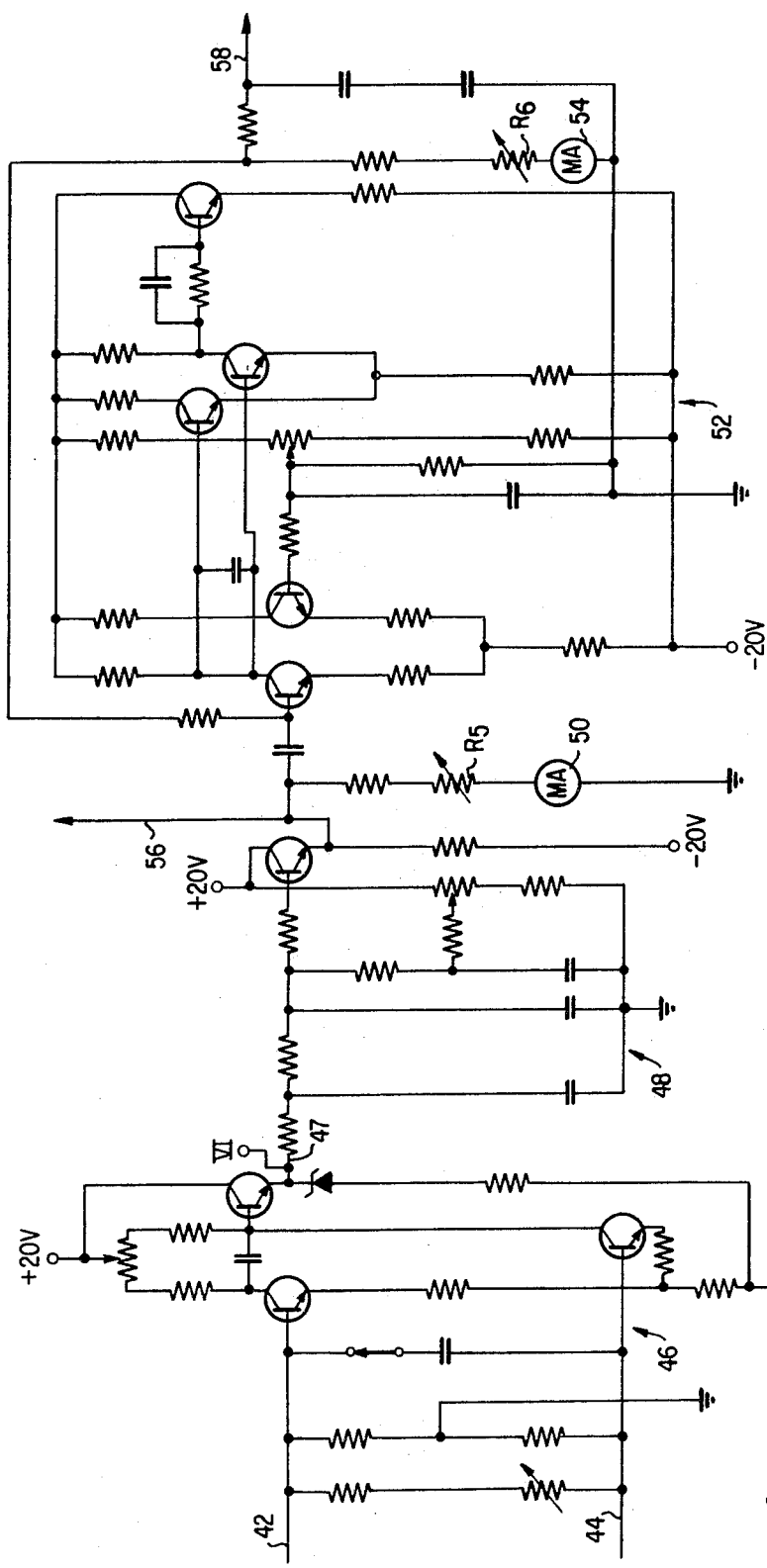

The output signals from channels 1 and 2 are logically combined at input leads 42 and 44 of differential amplifier 46. Thus, the actual inputs to the differential amplifier are as shown in waveforms 42a and 44a. The differential amplifier, shown in FIG. 2B, subtracts the magnitude of the signal on lead 42 from the magnitude of the signal on lead 44 and produces an output which is proportional to the difference. The result is a series of positive pulses as illustrated in waveform 47.

The output of differential amplifier 46 is applied to the filter 48 which removes the high-frequency components and performs a smoothing function. The average direct current output from the filter has a magnitude proportional to the difference in phase between E1 and E2, and has a positive polarity thereby indicating that E1 leads E2. The output from the filter drives the zero centered ammeter 50 to provide, as shown in FIG. 7, a visual indication that E1 leads E2 by 45°.

The output of filter 48 is differentiated by differentiator 52 and applied to ammeter 54 to provide an indication of the rate at which the phase difference between E1 and E2 is changing if, in fact, the phase is changing.

Figure 4:
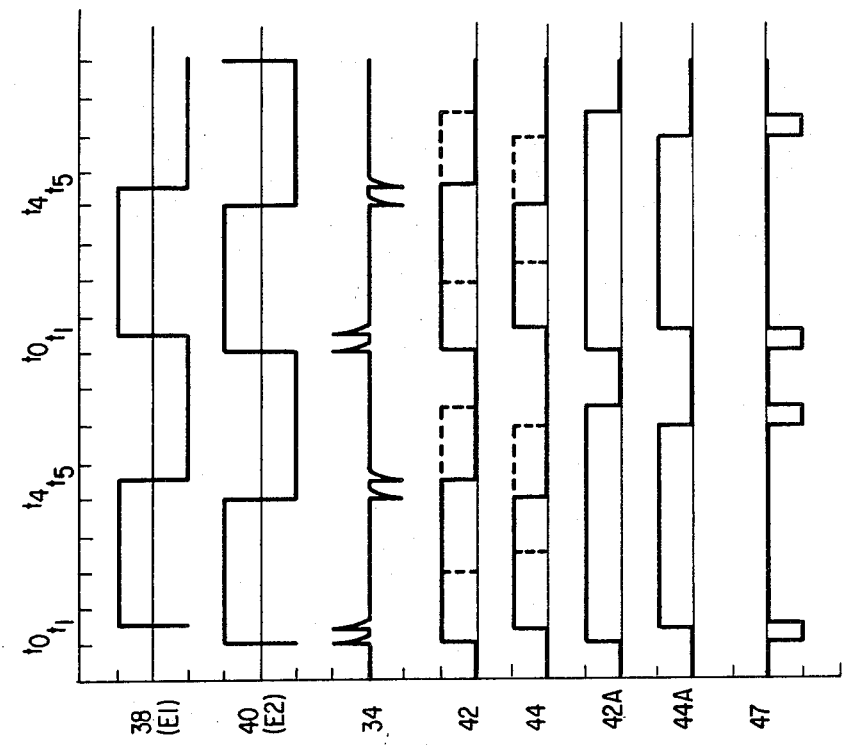
FIG. 4 illustrates the signal waveforms as they appear at various points in the circuit when the first input signal lags the second input signal.

FIG. 4 illustrates the operation of the device for the specific case where E1 lags E2 by about 22½°. At time $t_0$, when E2 goes positive, a differentiated positive pulse from square wave generator 18 sets the multivibrator 22 so that transistor Q1 is one and transistor Q2 is off. The negative signal from the collector of Q1 is applied over lead 31 to block gates 24 and 26. The positive signal from the collector of Q2 is applied over lead 33 to gates 28 and 30. At gate 28, the signal on lead 38 is negative thereby preventing a positive output to lead 44 through diode 62. At gate 30, the diode 64 is back biased by the high-level voltage on lead 40. Therefore, the gate 30 produces a positive output signal on lead 42.

At time $t_1$ the signal E1 goes positive. Square wave generator 16 produces a positive going square wave that is differentiated by capacitor 32 and applied to the multivibrator. Since Q1 is already on, this pulse does not switch the multivibrator.

At time $T_1$, the signal on lead 38 goes positive. Since a positive signal in being applied to gate 28 from the collector of Q2, both inputs to the gate are conditioned and it produces a positive output signal on lead 44.

At time $t_4$ the signal E2 goes negative. The output of square wave generator 18 drops to its low level as does the lead 40. The output of the square wave generator is differentiated by capacitor 36 and applied to multivibrator 22. This switches the multivibrator so that its output lead 31 becomes positive and output lead 33 becomes negative. The negative signal on lead 33 blocks gates 28 and 30 and the negative signal on lead 40 blocks gate 26 so the output signal to lead 44 terminates. However, gate 24 has positive voltage levels at both inputs so that it produces a positive output signal on lead 42.

At time $t_5$, when E1 goes negative, the signal on lead 31 goes negative thereby blocking gate 24. Waveform 42 returns to the low level at this time. Insofar as channel 1 is concerned, this completed one cycle of operation.

As in the preceding example, channel 2 functions in the same manner as channel 1, the only difference being that the signals produced in channel 2 are delayed approximately 86°. In FIG. 4 the broken outline in waveforms 42 and 44 indicates the voltage produced on leads 42 and 44 as a result of the operation of channel 2.

The signals from channels 1 and 2 are logically combined on leads 42 and 44 and applied to differential amplifier 46. Waveforms 42a and 44a illustrate the signals applied to the amplifier. The differential amplifier subtracts the magnitude of the signal on lead 42 from the magnitude of the signal on lead 44 and produces an output which is proportional to the difference between the signals. waveform 47 in FIG. 4, shows that the output of the differential amplifier is a sequence of negative pulses. The output of the amplifier is applied through filter 48 to meter 50 and through differentiator 52 to meter 54.

Figure 5:
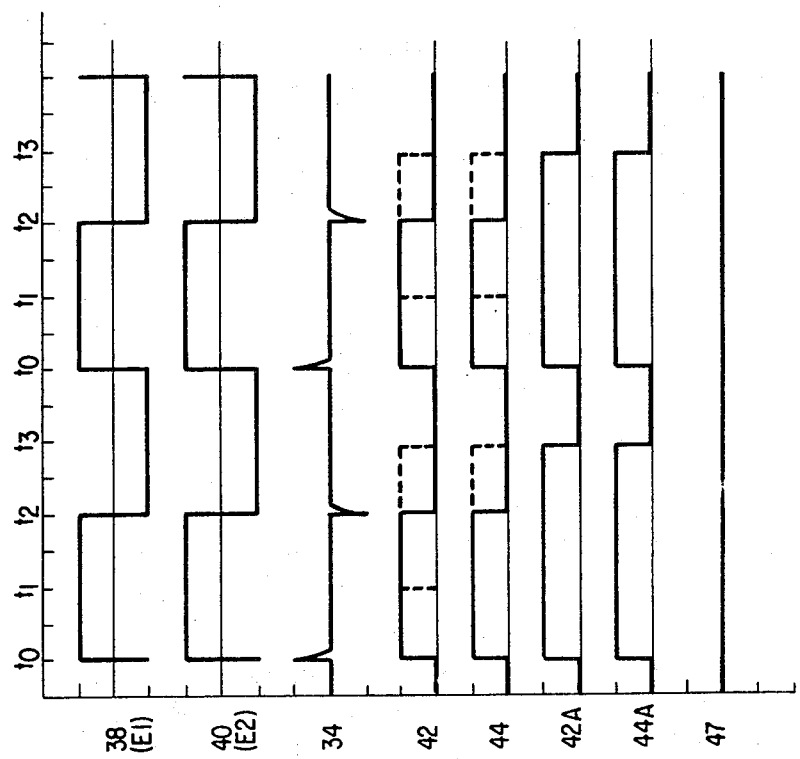
FIG. 5 illustrates signal waveforms as they appear at various points in the circuit when the first and second input signals are exactly in phase.

FIG. 5 illustrates the waveforms at various points within the device when E1 and E2 are exactly in phase. In view of the description given above with respect to FIG. 3 and 4, the derivation of the waveforms of FIG. 5 is believed to be obvious. However, it may be noted in passing that since E1 and E2 are in phase, the outputs from square wave generator 16 and 18 change simultaneously. Thus, the differentiated pulses of the same polarity appearing on line 34 are coincident in time. As explained above, a second pulse of the same polarity as a preceding pulse has no effect on the multivibrator 22. Hence, operation of the device is not altered when two differentiating pulses of the same polarity are coincident in time.

Since the waveforms 42a and 44a are identical when E1 and E2 are in phase, the resulting output of difference amplifier 46 is zero as shown by waveform 47.

Figure 6:
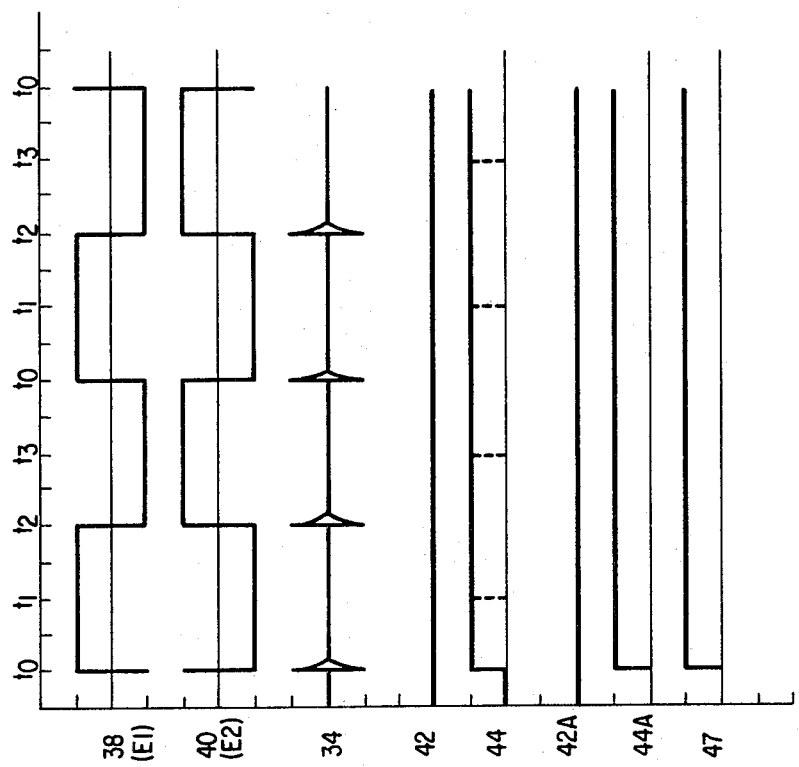
FIG. 6 represents signal waveforms as they appear at various points in the circuit when the first and second input signals are 180° out of phase.

FIG. 6 illustrates the waveforms at various points within the device when the phase difference between E1 and E2 approaches 180°. The waveforms shown represent ideal conditions which are not attainable in actual practice. When E1 and E2 are exactly 180° out of phase, the output of square wave generator 16 changes from a high level to a low level as the output of square wave generator 18 changes from the low level to the high level, and vice versa. Thus, differentiated pulses of opposite polarity appear simultaneously at the outputs of capacitors 32 and 36, as illustrated by waveform 34. If the multivibrator is in a state such that Q1 is one, the negative going pulse will turn Q1 off and switch the state of the multivibrator. On the other hand, if the multivibrator is in a state such that Q1 is off, the positive differentiated pulse turns Q1 on to switch the state of the multivibrator.

The state of multivibrator 22 is determined by the direction from which the condition of 180° phase difference was approached. If E1 leads E2 by 179° and E1 is advanced in phase by 1° with respect to E2, the multivibrator 22 will be in one state and changes state or direction when the condition of 180° phase difference is reached. On the other hand, if E2 leads E1 by 179° and the phase of E2 is advanced 1° with respect to E1, then the multivibrator 22 will be in a second state and changes state or direction when the condition of 180° phase difference is reached. One of the features of the instant invention is the fact that it makes no difference whether the 180° phase difference is approached from an E1 leading or an E2 leading condition.

If multivibrator 22 is in a state such that Q1 is on and Q2 is off, the offput from the multivibrator blocks gates 24 and 26 and conditions gates 28 and 30. Between $t_0$ and $t_2$ of each cycle, the positive signal on lead 38 further conditions gate 28 so that it produces a positive output signal on lead 44.

At time $t_2$ when the outputs of square wave generators 16 and 18 change state, the negative going pulse from square wave generator 16 is differentiated by capacitor 36 and applied to the multivibrator to turn off transistor Q1 and turn on transistor Q2. The resulting low-level voltage on lead 33 blocks the gates 28 and 30. The high-level voltage on lead 31 is applied to gates 24 and 26. During the interval $t_2$ to $t_0$ the high-level output on lead 40 back-biases the diode 70 in gate 26 so that this gate produces a high-level output signal on lead 44. At time $t_0$ the state of the multivibrator is again changed by the output from the square-wave generators and a new cycle is repeated. Thus, the signal on lead 44 remains at a high level, and the signal on lead 42 remains at a low level for the entire cycle. A similar situation exists for channel 2 except for the fact that there is an 86° lag in the signals.

The differential amplifier 46 subtracts the magnitude of the signal on lead 42 from the signal from the magnitude of the signal on lead 44 and thus produces at its output a positive pulse which is continuous throughout the cycle.

Had the condition of 180° phase shift been approached with E2 leading E1, then the multivibrator would have started in the opposite state and as a result, all of the positive pulses appearing on lead 38 would be gated through gate 24 to the lead 42 whereas all the positive pulses appearing on lead 40 would be gated through the gate 30 to the lead 42. In this case, the output of the differential amplifier 46 would still be a continuous pulse throughout the cycle, but it would be negative rather than positive.

It will be understood that there is a region at or very near the condition of 180° phase difference where the analyzer may produce an ambiguous meter reading because of the change from a maximum positive output signal to a maximum negative output signal or vice versa. However, this region is quite small in extent and the analyzer automatically resumes the presentation of an accurate reading on the meter scale.

From a comparison of FIGS. 3 through 6 several observations may be made. First, from a comparison of FIGS. 3 and 4, it is seen that the output waveform 47 from the differential amplifier 46 comprises a sequence of positive pulses when E1 leads E2 and comprises a sequence of negative pulses when E1 lags E2. Secondly, the output 47 of differential amplifier 46 comprises two pulses for each cycle of the signals being analyzed, if the phase difference between the signals being analyzed is greater than 0° and less than 180°. The duration of each of these pulses is equal to the difference in phase between the two signals being analyzed. Thirdly, as illustrated in FIG. 6, the two pulses merge into a single pulse of one-cycle duration when the two signals being analyzed approach the 180° out of phase condition. Fourthly, the pulses completely disappear and there is no output from the differential amplifier 46 when the two signals being compared are exactly in phase.

From the above description it should be obvious that after the output of differential amplifier 46 passes through filter 48, it becomes a varying DC signal whose average value is proportional to the difference in phase between the two signals being analyzed, and whose polarity is positive or negative depending upon whether the first or the second signal is leading. The meter reading will show zero when E1 is in phase with E2 and will increase in a positive or leading direction (See FIG. 7) as the phase difference between E1 and E2 increases, assuming E1 is leading. This continues until the phase difference approaches the region of ambiguity where the phase difference is about 180°. If E1 continues to gain in phase with respect to E2 so that E1 leads E2 by, for example, 181°, the pointer on the meter scale is deflected to the left to provide an indication of 179° lag. Those skilled in the art will recognize that the indication that E1 lags E2 by 179° is equivalent to an indication that E1 leads E2 by 181°. As E1 continues to gain in phase with respect to E2, the pointer on the meter scale shows a decreasing lag until, when E1 is 360° ahead of E2, the meter pointer again indicates zero phase difference.

By proper adjustment of the potentiometer R5 connected in series with ammeter 50, the current flow through the meter may be limited to some suitable value, such as 1 microampere/2° phase shift to provide an appropriate visual indication. The potentiometer R6 connected in series with ammeter 54 may be adjusted to limit current through the meter to some convenient value such as 1 microampere for each 2° per second of phase shift.

The present invention is admirably suited for use in a regulatory device for controlling 60-cycle apparatus. Since the sampling by channel 2 lags the sampling by channel 1 by approximately 86°, the device provides four samples per cycle. This enables the regulatory apparatus to provide an almost instantaneous response resulting in a closer control than would otherwise be possible.

In some applications, such as laboratory measurement, two samplings per cycle may be sufficient. In this case the elements comprising channel 2 may be eliminated.

While the invention has been described as analyzing the phase of two sine wave signals, it will be understood that the invention is equally adapted to analyze the phase between other types of alternating signals of various frequencies and shapes, such as square waves. Hence, while the invention has been particularly shown and described with reference to a preferred embodiment, it will be understood by those skilled in the art that various changes in form and detail may be made therein without departing from the spirit and scope of the invention as defined in the appended claims.

The embodiments of the invention in which an exclusive property or privilege is claimed are defined as follows:

1. A phase angle analyzer for analyzing the phase relationship between first and second signals, said analyzer comprising:
   a first channel including,
      a differential amplifier, having first and second inputs and first and second outputs;
      a bistable multivibrator having first and second outputs;
      first means responsive to said first and second signals for applying first and second square waves to the first and second inputs, respectively, of said differential amplifier;
      second means responsive to said first means for applying switching signals to said bistable multivibrator;
      first and second channel output leads;
      first and second gates responsive to the first and second outputs, respectively, of said differential amplifier and the first output of said bistable multivibrator;
      third and fourth gates responsive to the first and second outputs, respectively, of said differential amplifier and the second output of said bistable multivibrator;
   a further differential amplifier;
   means connecting said first and fourth gates to a first input of said further differential amplifier; and,
   means connecting said second and third gates to a second input of said further differential amplifier,
   whereby said further differential amplifier produces a sequence of output pulses, each of said pulses being proportional in duration to the magnitude of the difference in phase between said first and second signals, the polarity of said pulses depending upon which of said first and second signals is leading.

2. A phase angle analyzer as claimed in claim 1 and further comprising:
   a second channel like said first channel;
   means connecting the first and fourth gates of said second channel to said first input of said further differential amplifier; and,
   means connecting the second and third gates of said second channel to said second input of said further differential amplifier.

3. A phase angle analyzer as claimed in claim 2 wherein:
   said first and second signals are sine waves;
   said first means of said first channel comprises first and second square wave generator means responsive to said first and second signals, respectively; and,
   said first means of said second channel comprises first and second integrators responsive to said first and second signals and third and fourth square wave generator means responsive to said first and second integrators, respectively.

4. A phase angle analyzer as claimed in claim 3 and further comprising filter means responsive to said further differential amplifier for smoothing and purifying the output signal therefrom.

5. A phase angle analyzer as claimed in claim 4 and further comprising differentiator means responsive to said filter means for producing an output signal proportional to the rate of change of the phase difference between said first and second signals.

6. A phase angle analyzer as claimed in claim 4 and further comprising a meter connected to the output of said filter means for indicating whether said first signal leads or lags said second signal in phase, and the magnitude of the phase difference.

7. A phase angle analyzer as claimed in claim 6 wherein said meter comprises an ammeter connected between a reference potential and the output of said filter means.

8. A phase angle analyzer for analyzing the phase relationship between first and second alternating signals, said analyzer comprising:
   first and second square wave generator means responsive to said first and second alternating signals for producing first and second trains of square wave pulses alternating between first and second signal levels and having the same phase relationship as said alternating signals;
   first difference amplifier means having first and second inputs responsive to said first and second square wave generator means for producing at first and second outputs two trains of square wave pulses, the difference between said square wave trains being proportional to the phase difference between said alternating signals;
   a differential amplifier means having first and second inputs and an output; and,
   crossover switch means for selectively connecting the first and second outputs of said first difference amplifier to the first and second inputs respectively of said differential amplifier, or to the second and first inputs respectively of said differential amplifier.

9. A phase angle analyzer as claimed in claim 8 wherein said crossover switch means comprises:
   a multivibrator having first and second stable states;
   differentiator means responsive to said first and second square wave generators for applying switching pulses to said multivibrator;
   said multivibrator including means responsive to said switching pulses for switching to a first state only in response to a switching pulse of a first level and switching to a second state only in response to a switching pulse; and,
   gating means responsive to said multivibrator and said first and second outputs of said first difference amplifier means for selectively applying signals to the first and second inputs of said differential amplifier means whereby said differential amplifier means produces at its output a signal having a magnitude proportional to the phase difference between said first and second alternating signals and a polarity dependent upon which if said first and second alternating signals is leading.

10. A phase angle analyzer as claimed in claim 9 and further comprising:
   first and second integrators responsive to said first and second alternating signals, respectively;
   third and fourth square wave generator means responsive to said first and second integrators for producing third and fourth trains of square wave pulses alternating between first and second levels and having the same phase relationship as said alternating signals;
   second difference amplifier means having first and second inputs responsive to said third and fourth square wave generator means for producing at first and second outputs two trains of square wave pulses, the difference between said square wave trains being proportional to the phase difference between said alternating signals;
   a second multivibrator having first and second stable states;
   differentiator means responsive to said third and fourth square wave generators for applying switching pulses to said second multivibrator,
   said second multivibrator including means responsive to said switching pulses for switching to a first state only in response to a switching pulse of a first level and switching to a second state only in response to switching pulses of a second level; and,
   gating means responsive to said second multivibrator and the first and second outputs of said second difference amplifier means for selectively applying signals to the first and second inputs of said differential amplifier means.

* * * * *

PO-1050
(5/69)

UNITED STATES PATENT OFFICE
CERTIFICATE OF CORRECTION

Patent No. 3,631,340      Dated December 28, 1971

Inventor(s) Joseph G. Miller

It is certified that error appears in the above-identified patent and that said Letters Patent are hereby corrected as shown below:

Column 1, line 30, for "of the phase" read -- of a phase --.
Column 2, line 12, for "the second signal" read -- when the second signal --.
         line 73, for "also a applied" read -- also applied --.
Column 3, line 15, for "the signals on" read -- the signal on --.
Column 4, line 61, for "that each differential" read -- that the differential --;
         line 74, for "turning off Q6." read -- turning off Q2.--
Column 5, line 19, for "when $E_2$ goes" read -- when E2 goes --.
Column 6, line 24, for "one and transistor" read -- on and transistor --;
         line 37, for "At time $T_1$," read -- At time $t_1$, --;
         line 68, for "signals. waveform" read -- signals. Waveform --.
Column 7, line 23, for "Q1 is one," read -- Q1 is on, --.

Signed and sealed this 4th day of July 1972.

(SEAL)
Attest:

EDWARD M. FLETCHER, JR.
Attesting Officer

ROBERT GOTTSCHALK
Commissioner of Patents